April 7, 1942.   F. FREIMANN   2,279,119
COMBINED SOUND AND PICTURE REPRODUCING APPARATUS
Filed June 2, 1939   3 Sheets-Sheet 1

INVENTOR.
FRANK FREIMANN.
By Parkinson & Lane
ATTORNEYS.

April 7, 1942.    F. FREIMANN    2,279,119
COMBINED SOUND AND PICTURE REPRODUCING APPARATUS
Filed June 27, 1939    3 Sheets-Sheet 2

INVENTOR.
FRANK FREIMANN
By Parkinson & Lane
ATTORNEYS.

April 7, 1942.  F. FREIMANN  2,279,119
COMBINED SOUND AND PICTURE REPRODUCING APPARATUS
Filed June 2, 1939  3 Sheets-Sheet 3
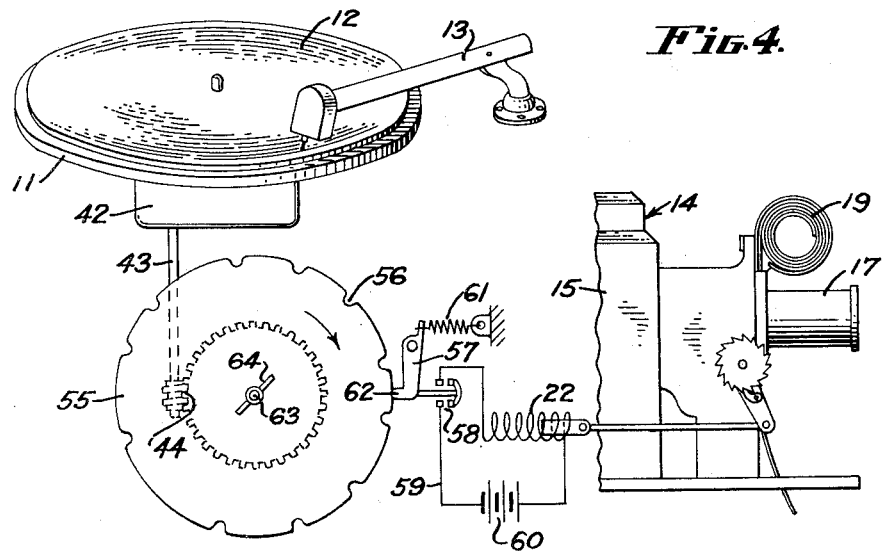
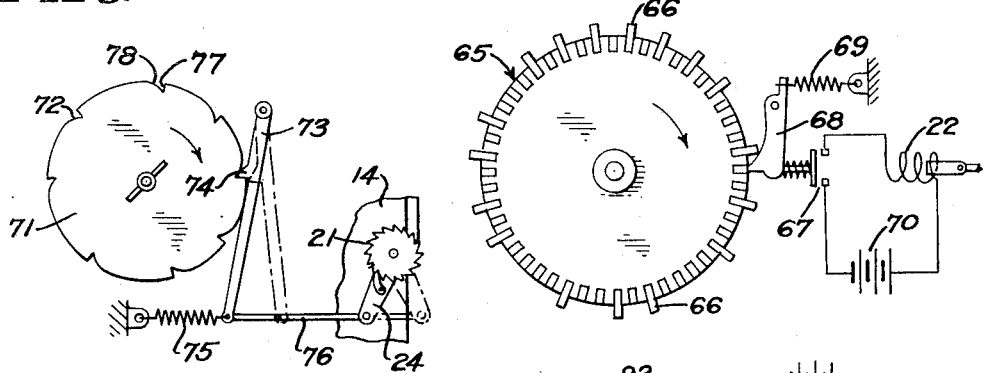
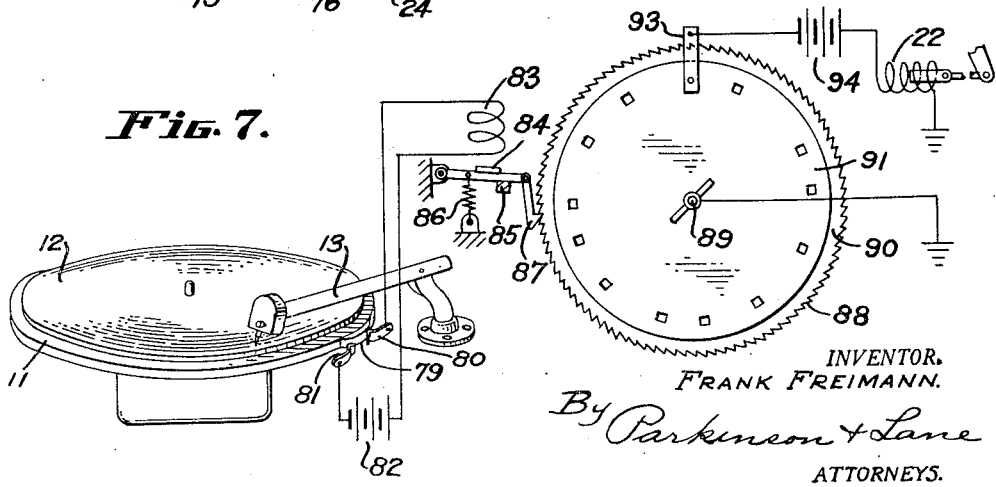
INVENTOR.
FRANK FREIMANN.
By Parkinson & Lane
ATTORNEYS.

Patented Apr. 7, 1942

2,279,119

UNITED STATES PATENT OFFICE 2,279,119

COMBINED SOUND AND PICTURE REPRODUCING APPARATUS

Frank Freimann, Fort Wayne, Ind., assignor to The Magnavox Company, Incorporated, Fort Wayne, Ind., a corporation of Indiana Application June 2, 1939, Serial No. 276,995

13 Claims. (Cl. 88—28)

This invention relates to improved means for automatically synchronizing the projection upon a screen or the like of still pictures, and the operation of a sound record pertaining to the subject matter of the pictures, so that the shifting of the pictures will be effected at the proper time to correlate the subject matter of the sound record with the subject matter of the pictures.

Among the objects of the invention are to put into practice the above mentioned purposes, the invention further comprehending the use of a picture program upon a strip of film in which the film will be automatically moved one frame at a time in synchrony with the beginning of the production on the sound record of sound pertaining to the frame of the picture then being moved into display position, regardless of whether the sound on the sound record be speaking, singing, or other sound effects, and in which the shifting of the pictures is controlled automatically by the operation of the sound record or the driving means for the same.

Heretofore it has generally been the custom to provide a sound signal upon the sound record to indicate to an attendant that the next picture should be moved into projecting position. This, however, required that the attendant be continually on the alert, which, due to diverting duties or other reasons, he would not do, with the result that the subject matter of the pictures and the subject matter of the sound from the sound record would not be properly and promptly correlated. Also such sound signals would be disturbing to the audience and correspondingly lessen the effectiveness of the program. Other efforts were made to utilize a tuned circuit and parts to be set in operation by a tone of certain frequency, but this required such complex and sensitive systems as to unduly increase the cost and lessen the dependability.

It is accordingly a further object of my invention to obviate the difficulties and objections referred to above, and provide apparatus of the kind described that will be of maximum simplicity, economy and dependability, can be operated successfully by an unskilled operator, and be pleasing in appearance and results produced.

Other objects, advantages and capabilities inherent in the invention will later more fully appear.

The invention further resides in the combination, construction and arrangement of parts illustrated in the accompanying drawings, and while I have shown therein preferred embodiments I wish it understood that the same are susceptible of modification and change without departing from the spirit of the invention.

In the drawings—

Fig. 4 is a diagrammatic view showing a further modification of the invention.

Figs. 5, 6 and 7 are diagrammatic views showing details of other modifications of the invention.

For the purpose of this description the invention is illustrated as embodied in apparatus of the so-called portable type such as is used extensively at the present time in sales promotion and lecture work. It is to be understood, however, that the invention may be embodied in other forms of apparatus, as for example, in larger cabinets for home entertainment and the like.

Figure 1:
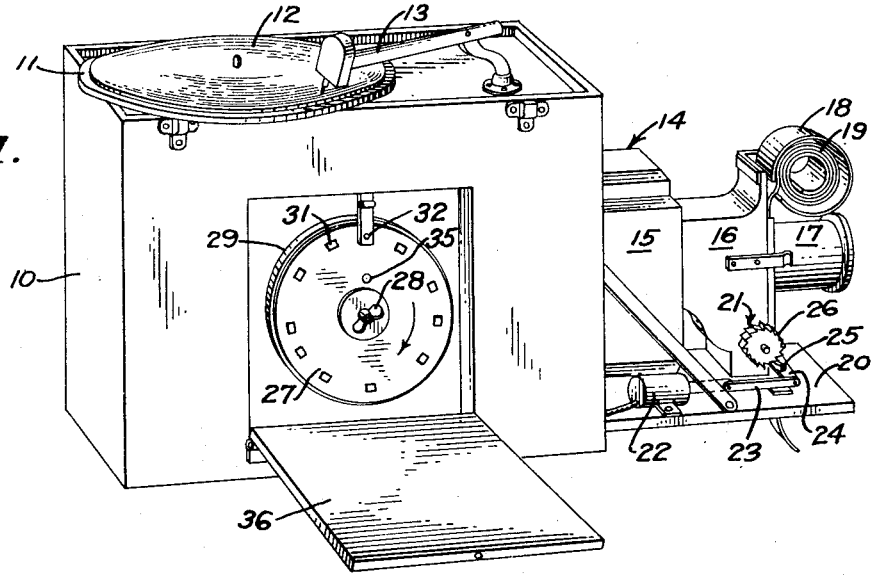
Fig. 1 is a perspective view showing the invention embodied in a portable, hand-carried sound and picture program reproducing device.
Figure 2:
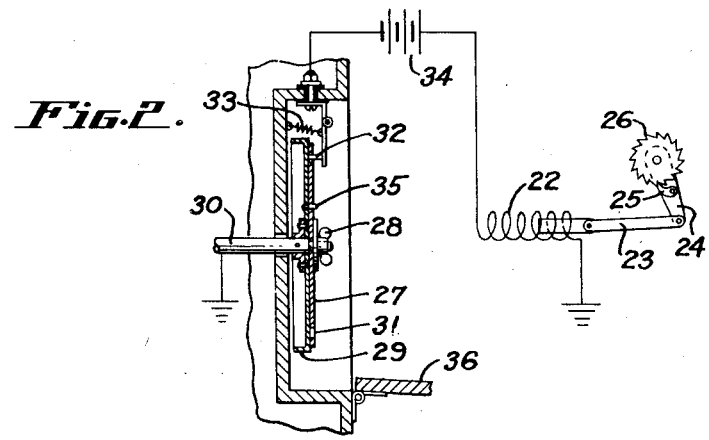
Fig. 2 is a fragmentary sectional and diagrammatic view showing details of the arrangement of Fig. 1.

In the embodiment of the invention illustrated in Figs. 1 and 2 of the drawings, the numeral 10 designates a carrying case which is provided with a removable cover (not shown). At the top of the carrying case 10 there is a motor driven sound record supporting platen 11 which is adapted to support a sound program record 12. Cooperating with the sound record 12 there is a tone arm 13 that operates in the well-known manner to pick up the sound program and reproduce same through a suitable amplifier and loudspeaker mounted within the carrying case 10. At the end of the carrying case 10 there is a picture projecting lantern 14 which comprises a lamp housing 15, a film framing gate 16, and the usual lens system 17. Mounted upon the film framing gate 16 there is a film receiving receptacle 18 into which a coil of loosely wound film 19 is adapted to be placed. The film 19 is shown as extending down through the film framing gate 16 and out through a slot in a supporting shelf-like member 20 carried by the carrying case 10. Associated with the film framing gate 16 there is a film advancing mechanism 21 that is adapted to advance the film 19 one frame at a time upon each operation thereof so that the lantern 14 will reproduce the pictures one at a time in succession from the film 19, which it is to be understood will be provided with a series of pictures illustrative of various portions of the sound program upon the record 12.

As a means for operating film advancing mechanism 21 there is an electromagnetic solenoid 22 which operates through a link 23 upon a lever arm 24 of the film advancing mechanism 21. The lever arm 24 carries a pawl 25 that cooperates with a ratchet-wheel 26 carried by the film advancing mechanism 21 and a spring means (not shown) within the film framing gate housing 16 operates to return the lever arm 24 to the position shown in the drawings after each operation thereof by the solenoid 22.

For synchronizing the reproduced pictures of the film 19 with predetermined portions of the sound record 12, the invention in one form contemplates the provision of a picture synchronizing record 27 which is driven at a substantially slower speed but in synchronism with the sound program record 12. This picture synchronizing record 27 as illustrated is in the form of a disc of paper or other insulating material and is adapted to be secured by a wing nut 28 upon a vertically disposed record supporting platen 29 carried by a shaft 30 that is driven by the record driving motor. As illustrated, the picture synchronizing record 27 is provided with circuit controlling apertures 31 through which a biased contact 32 may project and contact with the platen 29 to establish a circuit at each aperture as these apertures 31 are brought into alignment with the contact 32. The contact 32 is shown as biased into its contact making position by a spring 33 and as connected in the circuit of a battery 34 or other suitable source of power which will provide energy for the operation of the solenoid 22. The other side of this circuit is completed from the solenoid 22, through a ground connection and to the shaft 30 upon which the platen 29 is mounted. In order to properly synchronize the apertures 31 of the picture synchronizing record 27, this record is provided with a small aperture that cooperates with a pin 35 upon the platen 29 to properly position the synchronizing record 27 with respect to the starting point of the sound program record 12. As an alternative form, it will be understood that the picture synchronizing record 27 may be provided with metallic inserts instead of the apertures 31 for the purpose of establishing a circuit between the biased contact 32 and the supporting platen 29. The end of contact pin 32 will preferably have its free end sufficiently rounded, or beveled, so as not to tear or mar the material of the picture synchronizing record as it moves out of the apertures therein when apertures are used. The same is true of any of the other similar parts disclosed herein.

Figure 3:
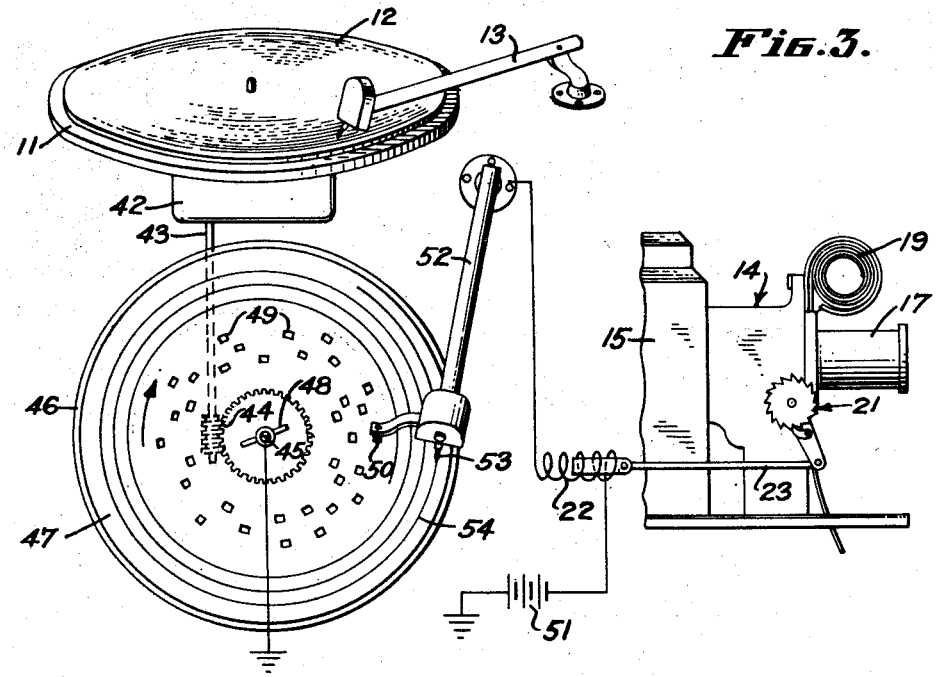
Fig. 3 is a diagrammatic view showing a modified form of the invention that is particularly adapted for use with a long sound program.

Reference is now made to Fig. 3 of the drawings wherein there is shown an embodiment of the invention employing a disc type of picture synchronizing record which is adapted to make more than one revolution during the playing of a complete sound program record. As here shown the sound record driving motor designated by the numeral 42 has a downwardly extending shaft 43 which operates through a worm and worm gear connection 44 to drive a horizontally disposed shaft 45. The shaft 45 carries a record supporting platen 46 upon which a picture synchronizing record 47 is adapted to be secured by means of a wing nut or other securing means 48. The picture synchronizing record 47 in this instance is provided with apertures or metallic inserts 49 that are arranged in a spiral path. This provides for a larger number of circuit controlling apertures than can be provided upon a record of the type illustrated in Figs. 1 and 2 of the drawings. Associated with the apertures (or metallic inserts) 49 of the record 47 there is a contact 50 that is adapted to cooperate with the record supporting platen 46 to establish an energizing circuit through a battery or other source of power 51 for the lantern operating solenoid coil 22. In order to provide for an alignment of the contact 50 with the spirally arranged apertures (or metallic inserts) 49 upon the record 47 this contact is mounted upon a swingable arm 52 which also carries guiding stylus 53. When in operation the stylus 53 is disposed in and cooperates with a spiral trackway 54 provided concentric to and arranged in parallel spiral relation with the path in which the apertures or inserts 49 of the record 47 are disposed.

In this arrangement it will be seen that when the record 47 is started with the contact 50 in alignment with the innermost aperture 49 the swingable arm 52 will be moved outwardly by the guiding stylus 53 as the record 47 continues to rotate and as a result the contact 50 will extend through each of the apertures 49 as they move thereunder to make contact with the platen 46 and thus cause the solenoid 22 to be energized and operate the film advancing mechanism.

In Fig. 4 of the drawings there is shown a further modification of the invention wherein the picture synchronizing record designated by the numeral 55 is provided with spaced notches 56 arranged around its peripheral edge. These notches 56 are adapted to be engaged by a switch operating lever 57 as the record 55 is rotated in synchronism with the sound record 12. The switch operating lever 57 is connected to a switch 58 that controls an energizing circuit 59 which includes a source of power 60 for the film operating solenoid 22. As shown the switch operating lever 57 is biased into engagement with the periphery of the picture synchronizing record 55 by means of a spring 61 and is arranged so that when its record engaging end 62 drops into one or the other of the notches 56 the switch 58 will instantaneously close the circuit of the solenoid 22 and cause the film advancing mechanism 21 to advance the film 19 one frame, where it will remain until a subsequent notch 56 comes into an operating position with respect to the lever 57. In this embodiment the picture synchronizing record 55 is not interposed in the control circuit and it, therefore, can be made of metal or any other suitable material. This record 55 like those previously described is removably secured upon a shaft 63 (or platen thereon) by means of a wing nut 64 so that it can be readily changed when the sound program record 12 is changed. The record supporting shaft 63 may have a record supporting platen or not as desired, and is driven by the phonograph driving motor 42 through the shaft 43 and a worm and gear connection 44 similar to that described above.

In Fig. 5 of the drawings there is shown an embodiment of the invention wherein the need for an individual picture synchronizing record for each sound record is dispensed with. This arrangement contemplates a picture synchronizing device designated by the numeral 65 which is provided with adjustable finger portions 66 that can be selectively arranged to operate a control switch 67 in the control circuit of the lantern operating solenoid 22. Where the picture synchronizing device 65 is provided with these adjustable finger portions 66 they can be turned outwardly at desired points (or moved from one hole to another) to thus provide raised surfaces or projections around the periphery of the device 65 which can be made to correspond with any selected sound program. This device makes it possible to dispense with a separate picture synchronizing record for each sound record. The picture synchronizing device 65 illustrated comprises a disc preferably having radially spaced slots into which the adjustable fingers 66 are pivotally mounted. Or, if desired, the projections 66 may be in the form of pins that may be removably inserted into holes in the edge of disc 65 arranged with the desired spacing.

With this arrangement it will be seen that when the device 65 is rotated as contemplated and various ones of the fingers 66 are turned out from the periphery of the disc 65, they will provide a series of irregularly spaced raised surfaces which will in point of time correspond with predetermined points upon the sound program record 12. These pivotally mounted fingers 66 will be closely and equally spaced around the periphery of the disc 65 so that when different fingers are turned out as shown a raised surface 66 may be provided at any desired point around the periphery of the disc 65. When the picture synchronizing device 65 is in operation and the fingers 66 are turned out at the desired points these fingers will engage a switch operating lever 68 which is biased against the fingers 66 by means of a spring 69. As these extended fingers 66 engage the switch operating lever 68 the latter lever will be moved to close circuit controlling contacts of the switch 67 and thus complete the energizing circuit of the solenoid 22 which, as in the previously described embodiments, will include a suitable source of power 70 for the solenoid 22. As this point it will be evident that the film advancing mechanism controlling switch 67, arranged as above described, can also be operated by separate and interchangeable picture synchronizing records similar to the record 55 (in Fig. 4) by substituting for the notches 56 thereof corresponding raised portions which are spaced to conform with the sound program. In such an event each sound record 12 will be accompanied by a separate and companion picture synchronizing record having raised portions located to correspond in point of time with the sound program.

In Fig. 6 of the drawings there is shown an embodiment of the invention wherein a picture synchronizing record 71 is arranged to mechanically control the operation of the film advancing means 21 of the lantern 14 without resort to an electrically controlled solenoid. In this arrangement a separate picture synchronizing record 71 will be provided with each sound program record. These records 71 will be driven in synchronism with the sound program record 12 and at a speed which will provide for approximately one revolution of the picture synchronizing record 71 during the playing of a sound program. The picture synchronizing record 71 as shown is provided with suitably arranged and spaced notches 72 that will form what may be termed a quick acting cam surface about the periphery of the record forming disc. Cooperating with the picture synchronizing record 71 there is a pivotally mounted lever 73 having a projection 74 that is adapted to be held into engaging relation with the periphery of the picture synchronizing record 71 by means of a spring 75. The spring 75 is connected to the outer or free end of the lever 73 and extending oppositely thereto there is a link 76 that connects with the lever arm 24 of the picture film advancing mechanism 21 upon the lantern 14.

With this arrangement it will be seen that as the picture synchronizing record 71 is rotated clockwise the pivotally mounted lever 73 will be caused to oscillate between two positions as shown by the full and dotted lines in this figure of the drawings. In operation the lever 73 will be normally held in its inoperative position by the periphery of the picture synchronizing record 71, but as each notch 72 thereof comes into alignment with the projection 74 of the lever 73 it will be moved to the left by the spring 75 and thus operate the film advancing mechanism 21 as will be readily understood. If the notches 72 of the picture synchronizing record 71 are provided with a substantial radially disposed forward end 77 and a gradual outwardly curved relief surface 78 as shown, the pivotally mounted lever 73 will move to the left (as viewed in Fig. 6) with a quick movement and then return gradually to its inoperative position, as indicated by dot and dash lines, without imposing any sudden load upon the record driving motor 42 which might interfere with a proper reproducing of the sound program.

Reference is now made to Fig. 7 of the drawings wherein there is shown a novel means for driving the platen which carries the picture synchronizing record. In this arrangement the sound record supporting platen 11 is provided with means that will periodically complete an electrical circuit upon each revolution thereof. This may be accomplished in many ways. As a preferred arrangement the sound record supporting platen 11 is illustrated as provided with a short current conducting segment 79 which is adapted to cooperate with two spaced stationary contacts 80 and 81 that form the terminals of a control circuit including a source of power 82 and in which a ratchet operating solenoid 83 is connected. Associated with the ratchet operating solenoid 83 there is a pivotally mounted armature 84 which is adapted to move between the solenoid 83 and a stop 85. The armature 84 is biased against the stop 85 by means of a light spring 86 and is adapted to be moved upwardly by the solenoid 83 upon each revolution of the sound record 12 as the contacts 80 and 81 are bridged by the segment 79 carried by the sound record supporting platen 11. At the outer end of the pivotally mounted armature 84 there is a ratchet engaging pawl 87 which engages the teeth of a large ratchet 88 that is carried by a shaft 89 upon which the synchronizing record supporting platen 90 is secured. As here shown the record supporting platen 90 carries a picture synchronizing record 91 of the type illustrated in Fig. 1 of the drawings and associated with the picture synchronizing record 91 there is a circuit completing contact 93 that operates through a battery or other source of power 94 and a ground connection to complete a circuit for the film advancing mechanism solenoid 22 as previously described.

With this arrangement it will be seen that because of the omission of a positive mechanical drive between the sound record driving motor and the picture synchronizing record supporting platen it will be possible to mount this latter platen at any convenient point within a cabinet. It will also be apparent that with this type of step by step drive for the platen 90 the matter of obtaining the high speed reduction between the synchronizing record supporting platen 90 and a sound record supporting platen 11, which in the case of a 15 minute sound program may be at the ratio of 500 to 1, is greatly simplified. With such a sound program the proper ratio of speeds between these two platens will be provided by forming the ratchet 88 with 500 teeth about its periphery.

Figure 8:
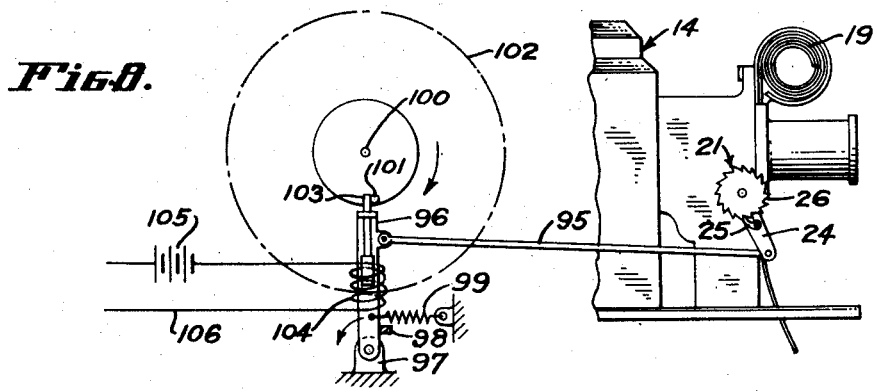
Figs. 8 and 9 are diagrammatic views showing arrangements wherein the sound record driving motor is utilized to provide the actuating power for the lantern film advancing mechanism.

In Fig. 8 of the drawings there is shown a further modification of the invention wherein the film advancing mechanism 21 of the lantern 14 is adapted to be operated by power derived from the sound record driving motor. In this embodiment of the invention the lever arm 24 of the film advancing mechanism 21 is provided with a rearwardly extending link or other means 95 which connects with a pivotally mounted lever 96 that is adapted to be oscillated by the sound record driving motor as will hereinafter appear. The lever 96 is shown as pivotally mounted upon a support 97 and as biased against a stop 98 by means of a spring 99. While the spring 99 is here illustrated, it will be understood that this spring may be dispensed with if the return spring of the film advancing mechanism 21 upon the lantern 14 is of sufficient strength to control this movement of the lever 96 as it operates to return the film advancing mechanism to its initial inoperative position. The lever 96 may be mounted in any suitable manner with respect to the axis of the shaft which carries the sound record supporting platen 11 or it may be associated with a separately driven mechanism, as for example, a shaft 100 which carries an eccentrically disposed pin 101 as illustrated in this figure of the drawings. In this showing it is intended that the shaft 100 represent a shaft or spindle upon which a sound record designated by the numeral 102, and shown by dot and dash lines, is mounted. It is conceivable that the eccentrically disposed pin 101 may be in the form of a projection upon the sound record supporting platen 11. As a means for establishing a driving connection between the pivotally mounted lever 96 and the eccentrically disposed pin 101 and thus impart a movement to the lever 96, which will serve to operate the film advancing mechanism 21, the lever 96 is provided with a slidable bolt-like member 103 that is adapted to be extended from the end thereof upon the energization of a solenoid 104. The solenoid 104 is adapted to be periodically energized from a suitable source of power 105 by means of a control circuit 106 with which one of the above described or other similar form of picture synchronizing record is associated. With this arrangement it will be seen that whenever the circuit 106 is energized the solenoid 104 carried by the pivotally mounted lever 96 will cause the slidable bolt-like member 103 to move outwardly into the path of the eccentrically rotating pin 101 and as this pin 101 moves around in its circular path it will impart an angular movement to the pivotally mounted lever 96 which will be sufficient to complete an operation of the film advancing mechanism 21 and thus move the film 19 one frame through the film framing gate 16 and expose the next following picture upon the film 19 for reproduction. In this particular embodiment of the invention it is contemplated that the dimensions of the apertures or inserts of the picture synchronizing record will be of such a length in point of travel as to provide for not more than one operation of the pivotally mounted lever 96 during any two succeeding revolutions of the sound record.

Figure 9:
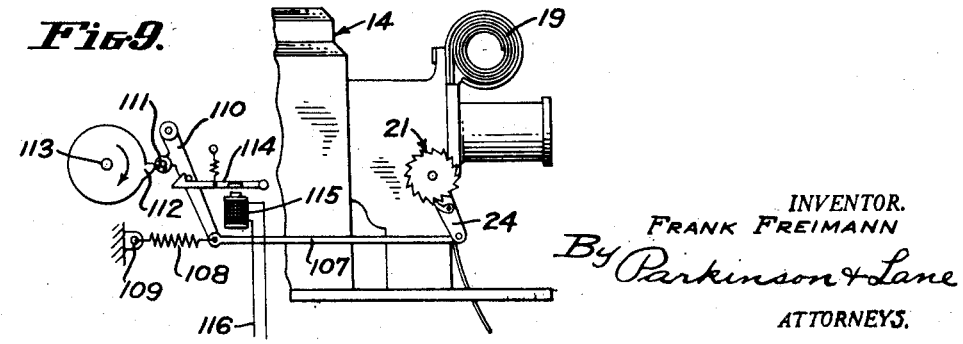

In Fig. 9 of the drawings there is shown a further embodiment of the invention wherein the film advancing mechanism is operated by a spring means in which operating power derived from the sound record driving motor is stored. In this particular embodiment the lever 24 of the film advancing means 21 is carried by the picture reproducing lantern 14 is provided with a rearwardly extending link 107 which is adapted to be moved in a film advancing direction by means of an energy storing spring 108. The spring 108 is secured at one end to a fixed support 109 and as a means for storing energy into this spring its other end is carried by a pivotally mounted lever 110 to the outer end of which the rearwardly extending link 107 is also connected. The pivotally mounted lever 110 carries a cam engaging roller 111 that is adapted to be engaged by a cam surface 112 mounted upon a shaft 113 that is adapted to be driven by the sound record driving motor. As the cam engaging roller 111 upon the pivotally mounted lever 110 is engaged by the cam surface 112 this lever will be moved in a counterclockwise direction and into the position shown where it will be latched by means of a latching armature 114. When the lever 110 is latched in this manner it will be understood that the operating spring 108 will be extended so that when the latching armature 114 releases the pivotally mounted lever 110 the rearwardly extending link 107 will be moved to the left and thus operate the film advancing mechanism 21 and advance the picture film 19 through the film framing gate 16 a distance of one frame. For the purpose of controlling the operations of the latching armature 114 there is a suitable solenoid 115 which is adapted to be energized by means of a circuit 116 controlled by a picture synchronizing record of the circuit controlling type hereinabove described. In this arrangement the cam surface 112 upon the shaft 113 will preferably be of a minimum arcuate length and as a result the pivotally mounted lever 110 will be free to move in a film advancing direction throughout substantially all of the time consumed by the cam 112 in making a complete revolution. In any event should the latch 114 be released as when the parts are in the position shown it will still be seen that due to the timing of the electrically controlled circuit 116 this latching armature will be held out of its latching engagement with the lever 110 until the cam 112 has cleared the roller 111 and at such time the lever 110 will be free to impart an operating force upon the connecting link 107 and thus actuate the film advancing mechanism 21 in the manner above described.

Having now described my invention, I claim:

1. Apparatus for correlating the operation of picture projecting means and sound producing means, comprising in combination a sound program reproducing device having a sound record supporting means, means for reproducing sound from the record on said supporting means, means for driving said supporting means, picture projecting means including a film advancing means for advancing a film frame by frame as the sound program progresses, and a picture synchronizing means adapted to be driven by the sound record driving means and in synchronism with the sound record, a rotatable indexing disc, means for rotating said disc in synchronism with the sound record supporting means but at a proportionately slower speed, and a disc-like record on said indexing disc having means for controlling the movement of the picture film to cause the pictures to be projected in synchronism with the subject matter of the sound program.

2. Apparatus for correlating the operation of picture projecting means and sound producing means, comprising in combination a sound record supporting means and means for rotating the same, picture projecting means including a film advancing means for advancing a film frame by frame, a rotatable indexing disc, means for rotating said disc in synchronism with said sound record supporting means but at a slower speed, a sheet-like record carried by said disc continually rotatable therewith and having means for controlling the movement of the picture film to cause the pictures to be projected in synchronism with the subject matter of the sound from the sound record.

3. In a synchronized sound and picture program reproducing apparatus, the combination of a sound program reproducing device comprising a sound record supporting platen, a pick-up and a sound reproducer, means for driving said sound record supporting platen, a picture projecting lantern having a film advancing means associated therewith for advancing the film frame by frame as the sound program progresses, a second record supporting platen adapted to be driven in synchronism with said first record supporting platen but at a substantially slower speed, and a picture synchronizing disc mounted upon said second record supporting platen having characteristics comparable to the recording upon said sound record, and means associated with said picture synchronizing disc and said second record supporting platen and responsive to said picture synchronizing disc for controlling the operations of said film advancing means in an automatic manner as the picture synchronizing disc is driven during the sound program reproducing period of the sound record.

4. In a synchronized sound and picture program reproducing apparatus, the combination of a sound program reproducing device comprising a sound record supporting platen, a pick-up and a sound reproducer, means for driving said sound record supporting platen, a record for said platen having a sound program thereupon, a picture projecting lantern having an electromagnetic picture film advancing means associated therewith, a continuous film having a picture program arranged thereupon corresponding to the sound record program, an electrical circuit including a source of power for operating said electromagnetic picture advancing means, a circuit controlling switch in said electrical circuit, a second record supporting platen adapted to be driven in synchronism with said sound record supporting platen, and a picture synchronizing disc on said second record supporting platen and having means arranged thereupon corresponding to the program upon said sound record for controlling the operation of said circuit controlling switch, whereby said electromagnetic picture advancing means will be actuated to advance the picture film through said lantern in an automatic manner at predetermined points throughout the sound program.

5. In a synchronized sound and picture reproducing apparatus, the combination of a sound reproducing device employing a record having a recorded sound program, a picture projecting lantern adapted to reproduce pictures from a continuous film, a continuous film having a picture program thereupon corresponding to a sound record for said sound reproducing device, a film advancing means associated with said lantern for moving said film frame by frame to reproduce successive pictures, electromagnetic means for controlling the operation of said film advancing means, an electrical circuit including a source of power for said electromagnetic means, a metallic platen connected to one side of said circuit adapted to be driven at a reduced speed in synchronism with the sound record of said sound reproducing device, a stationary contact adjacent said metallic platen normally biased into contact making engagement with the surface thereof, and a disc of insulating material adapted to be secured upon said metallic platen and move beneath said contact, said disc of insulating material having apertures therein arranged at spaced points corresponding in point of time with predetermined points along the sound record program and through which said contact may project to establish the circuit of said electromagnetic means as said disc of insulating material moves therebeneath, whereby said film advancing means will operate to advance the picture film program through said lantern in synchronism with the sound program reproduced by said sound reproducing device.

6. In a synchronized sound picture reproducing apparatus, the combination of a sound reproducing device employing a record having a recorded sound program, a picture projecting lantern adapted to reproduce pictures from a continuous film, a continuous film having a picture program thereupon corresponding to a record for said sound reproducing device, a film advancing means associated with said lantern for moving said film frame by frame to reproduce successive pictures, electromagnetic means for controlling the operation of said film advancing means, an electrical circuit including a source of power for said electromagnetic means, a metallic platen connected to one side of said circuit adapted to be driven at a reduced speed in synchronism with the sound record of said sound reproducing device, a stationary contact adjacent said metallic platen normally biased into contact making engagement with the surface thereof, and a disc of insulating material adapted to be secured upon and move with said metallic platen beneath said contact, said disc of insulating material having metallic inserts arranged thereupon at spaced points corresponding in point of time with predetermined points along the sound record program and through which a circuit will be established between said contact and said platen as said disc of insulating material moves beneath said contact, whereby said film advancing means will operate to advance the picture film program through said lantern in synchronism with the sound program reproduced by said sound reproducing device.

7. As a means for synchronizing pictures with a sound program in apparatus of the character described, having a sound reproducing device employing a sound record and a picture projecting lantern for reproducing a series of pictures from a continuous film and having an electromagnetic film advancing means and control circuit therefor, the combination of a rotatable member adapted to be driven in synchronism with the sound record of said sound reproducing device, a picture program control member of non-conducting material adapted to be secured upon and rotate with said rotatable member, said picture program controlling member having a series of circuit controlling apertures arranged in spiral and spaced relation thereupon at points corresponding in point of time with predetermined points upon the sound program record, an electrical contact member adapted to make contact with said rotatable member through said apertures, said contact and said rotatable member forming parts of the circuit of the electromagnetic lantern operating means, a spiral trackway upon said picture program controlling member, and means engaging said spiral trackway and associated with said contact for retaining said contact in the path of the spirally arranged apertures of said picture controlling member as the sound program of the sound reproducing device progresses.

8. Apparatus for correlating the operation of picture projecting means and sound producing means, comprising in combination a sound record supporting means and means for rotating the same, picture projecting means including a film advancing means for advancing a film frame by frame, a rotatable platen, means for rotating said platen in synchronism with said sound record supporting means but at a slower speed, a disc-like control sheet carried by said platen and continually rotatable therewith and having means for controlling the movement of the picture film to cause the pictures to be projected in synchronism with the subject matter of the sound from the sound record, said last mentioned means including electromagnetic means operated by said controlling means for effecting said movement of the picture film.

9. In a machine of the class described, a disc type sound reproducing apparatus, a slide film picture projector means for advancing the film, means for synchronizing the sound record with the slide film picture comprising a rotatable indexing disc adapted to be driven in step with the sound record, and a picture synchronizing disc on said indexing disc having means for controlling the film advancing means to cause the picture to be automatically projected in synchronism with the subject matter of the rotating sound disc.

10. In a machine of the class described, a disc type sound reproducing apparatus, a slide film projector, means for advancing the film, means for synchronizing the sound record with the slide film picture comprising a rotatable indexing disc adapted to be driven in step with the sound record, and a picture synchronizing disc on and rotating with said indexing disc for controlling the slide film to cause the picture to be automatically projected in synchronism with the subject matter of the rotating sound disc.

11. In a machine of the class described comprising a disc type sound reproducing apparatus, a slide film and a projector having means for advancing the film, means for synchronizing the sound record with the picture comprising a rotatable indexing disc adapted to be driven in step with the sound record, and a picture synchronizing disc carried upon the face of said indexing disc having means to cause the closing and opening of an electrical circuit for controlling the movement of the picture film to project the picture in synchronism with the subject matter of the sound program.

12. In a control and operating mechanism for a slide film projector, a disc type sound reproducing mechanism, a metal platen driven in step with the sound record, an insulating indexing disc carried by said platen and provided with a plurality of spaced openings, a fixed spring pressed contact member forming one side of a switch adapted to register with said openings and form a contact with said platen for controlling the movement of the picture film to cause the pictures to be projected in synchronism with the subject matter of the sound program.

13. In a control and operating mechanism for a slide film projector, a disc type sound reproducing mechanism, a rotatable metal platen driven in step with the sound record, an insulating indexing disc carried by said platen provided with a plurality of spirally arranged spaced openings, a fixed spring pressed contact member forming one side of a switch and adapted to register with said openings and form a contact with said platen for controlling the movement of the picture film to cause the pictures to be projected in synchronism with the subject matter of the sound program, and a spiral trackway for causing said contact member to follow the path of said spirally arranged spaced openings.

FRANK FREIMANN.